United States Patent
Ribble et al.

(10) Patent No.: US 11,534,975 B2
(45) Date of Patent: Dec. 27, 2022

(54) METHOD OF DESIGNING A PART FOR ADDITIVE MANUFACTURING (AM) THAT WILL INCREASE PART ACCURACY AND REDUCE THE NEED FOR POST PROCESSING

(71) Applicant: The Boeing Company, Chicago, IL (US)

(72) Inventors: Ian Ribble, Ridgeville, SC (US); Nicholas A. Norman, Summerville, SC (US)

(73) Assignee: THE BOEING COMPANY, Chicago, IL (US)

( * ) Notice: Subject to any disclaimer, the term of this patent is extended or adjusted under 35 U.S.C. 154(b) by 186 days.

(21) Appl. No.: 16/564,816

(22) Filed: Sep. 9, 2019

(65) Prior Publication Data

US 2021/0069985 A1    Mar. 11, 2021

(51) Int. Cl.
| | |
|---|---|
| B32B 3/24 | (2006.01) |
| B29C 64/393 | (2017.01) |
| B33Y 50/02 | (2015.01) |
| B33Y 80/00 | (2015.01) |
| B29L 31/30 | (2006.01) |
| B32B 3/26 | (2006.01) |

(52) U.S. Cl.
CPC ............ *B29C 64/393* (2017.08); *B33Y 50/02* (2014.12); *B33Y 80/00* (2014.12); *B29L 2031/3076* (2013.01); *B32B 3/266* (2013.01); *Y10T 428/24306* (2015.01)

(58) Field of Classification Search
CPC .............................. B29C 64/393; B33Y 80/00
See application file for complete search history.

(56) References Cited

U.S. PATENT DOCUMENTS

| | | | | |
|---|---|---|---|---|
| 6,162,002 | A * | 12/2000 | Rohrmoser | F16B 19/14 411/441 |
| 6,177,749 | B1 * | 1/2001 | Hussey | H02K 1/26 310/216.011 |
| 10,252,325 | B1 * | 4/2019 | Troitino Lopez | B22C 9/10 |
| 2001/0036327 | A1 * | 11/2001 | Ishikawa | F16C 33/107 384/121 |
| 2003/0034379 | A1 | 2/2003 | Jackson et al. | |
| 2010/0071515 | A1 * | 3/2010 | Teng | F16B 37/048 81/44 |
| 2019/0070664 | A1 * | 3/2019 | Paniogue | B22F 3/1055 |

FOREIGN PATENT DOCUMENTS

| | | |
|---|---|---|
| EP | 3045739 | 7/2016 |
| EP | 3326816 | 5/2018 |
| WO | 00/28642 | 5/2000 |

OTHER PUBLICATIONS

Extended European Search Report dated Feb. 17, 2021 for European Patent Application No. 20192925.4.

* cited by examiner

*Primary Examiner* — William P Watkins, III
(74) *Attorney, Agent, or Firm* — Gates & Cooper LLP (57) ABSTRACT

A method of manufacturing a part having an opening for receiving an insert, including forming the opening having an internal surface wherein the internal surface has a polygonal cross-section including a plurality of sides. The polygonal cross-section comprises a polygon having an area larger than a cross-section of the insert, and the sides constrain the insert so as to locate the insert in the opening when the insert is inserted into the opening.

20 Claims, 10 Drawing Sheets

METHOD OF DESIGNING A PART FOR ADDITIVE MANUFACTURING (AM) THAT WILL INCREASE PART ACCURACY AND REDUCE THE NEED FOR POST PROCESSING

BACKGROUND

1. Field

The present disclosure relates to a method of manufacturing openings for inserts.

2. Description of the Related Art

Many structures (e.g., aircraft structures) are assembled from structural parts that are secured together with fasteners such as pins or rivets. A current practice typically involves first clamping the parts together with the holes through the two parts being aligned. The fastener is then inserted through each of the holes with the fastener's head positioned on one side of the structural parts and the fastener's tail projecting from the opposite side of the structural parts.

An aircraft typically includes thousands of such structural parts and therefore a large number of parts with holes need to be manufactured with high accuracy and tight tolerance requirements. The tooling for locating said parts (e.g. locating Jigs) and producing said holes (e.g. drill Jigs) require high accuracy and have even tighter tolerance requirements. Currently, additive manufacturing is used to manufacture such parts and tools, printing the parts and tools so that the holes are without internal features or so that the holes have undersized internal features (i.e., the holes have undersized diameters that are too small to receive the fasteners). The internal features or the holes are then finished or incorporated into the parts during a post-print machining process (e.g., a manual or Computer Numerical Control (CNC) milling process). However, post-print machining adds cost and lead time as well as potentially compromises the as-printed tolerances of the parts.

Stereolithographic (STL) computer aided design (CAD) files are used to control the CNC milling or additive manufacturing process of the parts. However, the resolution of the STL files is another contributor to part inaccuracies. The existing solution for improving the accuracy of the STL file is to increase the amount of triangle tessellations used to represent the part surfaces (i.e., to make the mesh triangles smaller). However, this leads to an exponential increase in the STL file size for the part. Additionally, this approach does not account for any inaccuracies caused by the printer during part fabrication.

What is needed are more efficient and accurate methods of manufacturing holes for receiving fasteners. The present disclosure satisfies this need.

SUMMARY

The present disclosure describes a method of manufacturing the part (product or tooling) having an opening for receiving an insert, including forming the opening having an internal surface including a plurality of facets, the opening having a cross-sectional area having a first cross-sectional area larger than a second cross-sectional area of the insert, the insert comprising an outer contact surface, the facets each comprising a plane tangent at tangent points to the outer contact surface, the facets constraining the insert so as to locate the insert in the opening when the insert is inserted into the opening, and wherein the tangent points are the only contact points between the internal surface and the outer contact surface.

The method can be embodied in many ways including, but not limited to, the following.

1. The method wherein the internal surface has a polygonal cross-section including a plurality of sides. The polygonal cross-section comprises a polygon having an area larger than a cross-section of the insert and the sides constrain the insert so as to locate the insert in the opening when the insert is inserted into the opening. The sides are tangent at discrete points to an outer contact surface of the insert and the tangent points are the only contact points between the internal surface and the outer surface.

2. The method further comprising manufacturing the part and the opening using additive manufacturing (e.g., the process of joining materials to make objects from three dimensional model data, depositing the material layer upon layer so as to build up the object).

3. The method of any of the above examples, further comprising generating a data file including the dimensions and a shape of the polygonal cross-sections or opening; and wherein the manufacturing comprises forming the opening having the shape and dimensions obtained from the data file.

4. The method of any of the examples 1-3, wherein the apparatus manufacturing the part uses a method of additively manufacturing the part by depositing, fusing or solidifying material layer (1006) by layer at locations determined from the data file so as to form the part comprising the material.

5. The method of examples 1-4, further comprising manufacturing the part using additive manufacturing, wherein (1) the internal surfaces comprise planar facets, the planar facets fully and accurately represented by the data file regardless of the data file's size, (2) the planar facets contact the insert at tangent points so that only a tolerance of the manufacturing at the tangent points is transferred to the insert, instead of having tolerances for the entire/entirety of the part being transferred to the insert, and (3) the tolerance transferred to the insert enables an "as printed" part to meet the "as designed" tolerance requirements with little to no post processing of the planar facets.

6. The method of any of the examples 1-4, wherein a number of the planar facets per opening is between 3 and 16.

7. The method of any of the examples 1-6, wherein the polygonal cross-section reduces a number of post processing steps required to modify dimensions of the opening, as compared to an opening having a circular cross section.

The present disclosure further describes a part manufactured using the methods described herein. The part can be embodied in many ways including, but not limited to, the following.

8. A part comprising an opening for receiving an insert, the opening including a plurality of facets, the opening having a cross-sectional area having a first cross-sectional area larger than a second cross-sectional area of the insert, the insert comprising an outer contact surface, the facets each comprising a plane tangent at tangent points to the outer contact surface, the facets constraining the insert so as to locate the insert in the opening when the insert is inserted into the opening, and wherein the tangent points are the only contact points between the internal surface and the outer contact surface.

9. The part of example 8, wherein the internal surface includes a curved surface having a radius, and the facets comprise at least two adjacent facets connected by the curved surface 10. A part comprising an opening for receiving an insert, the opening including an internal surface having a polygonal cross-section including a plurality of sides, wherein the polygonal cross-section comprises a polygon having an area larger than a cross-section of the insert, and the sides constrain the insert so as to locate the insert in the opening when the insert is inserted into the opening.

11. The part of example 7, 8, or 9 or 10 wherein the insert comprises a locator or a fastener.

12. The part of examples 7-11 wherein the insert comprises a bushing.

13. The part of examples 7-12 wherein the part is a drill jig.

14. An aircraft comprising the part of examples 7-13.

15. The part of examples 7-14, wherein the part comprises at least one structural element selected from a panel, a skin, a frame, and a frame section.

16. An aerodynamic fairing comprising the part of examples 7-15.

17. A housing for a hose or wiring, a hose assembly, or a wiring assembly, comprising the part of examples 7-16.

18. The part of claim examples 7-17 comprising an additively manufactured part.

19. The part of example 18, wherein the sides of the polygonal cross-section consist essentially of a surface of material deposited by additive manufacturing, and/or the sides do not include a reamed surface or are not post processed (after the material is joined using additive manufacturing) so as to modify a diameter or surface area of the opening.

The present disclosure further describes a computer implemented system for manufacturing a part, comprising one or more processors; one or more memories; and a program stored in the one or more memories, wherein the program executed by the one or more processors generates a data file for controlling an apparatus manufacturing a part having an opening for receiving an insert, the data file including dimensions and a shape of an internal surface of the opening, the dimensions and the shape defining the internal surface having facets and/or a polygonal cross-section including a plurality of sides as described in examples 1-18, wherein the facets or polygonal cross-section comprises a polygon having an area larger than a cross-section of the insert, and the sides or facets constrain the insert so as to locate the insert in the opening when the insert is inserted into the opening. In one example, the data file comprises a mesh comprising tessellated triangles that are designed to be tangent to a contact surface of the insert at one point per edge of the triangle.

BRIEF DESCRIPTION OF THE DRAWINGS

FIG. 4A, FIG. 4B, and FIG. 4C are parts manufactured to compare tolerance results for a hole locating a slip fit bushing and manufactured using a conventional method (FIG. 4A) and according to examples described herein (FIG. 4B and FIG. 4C), wherein FIG. 4B illustrates an opening for locating a slip fit bushing and FIG. 4C illustrates an opening for locating a press fit (i.e. interference fit) bushing.

DESCRIPTION

In the following description, reference is made to the accompanying drawings which form a part hereof, and which is shown, by way of illustration, several examples. It is understood that other examples may be utilized and structural changes may be made without departing from the scope of the present disclosure.

Technical Description

Figure 1A:
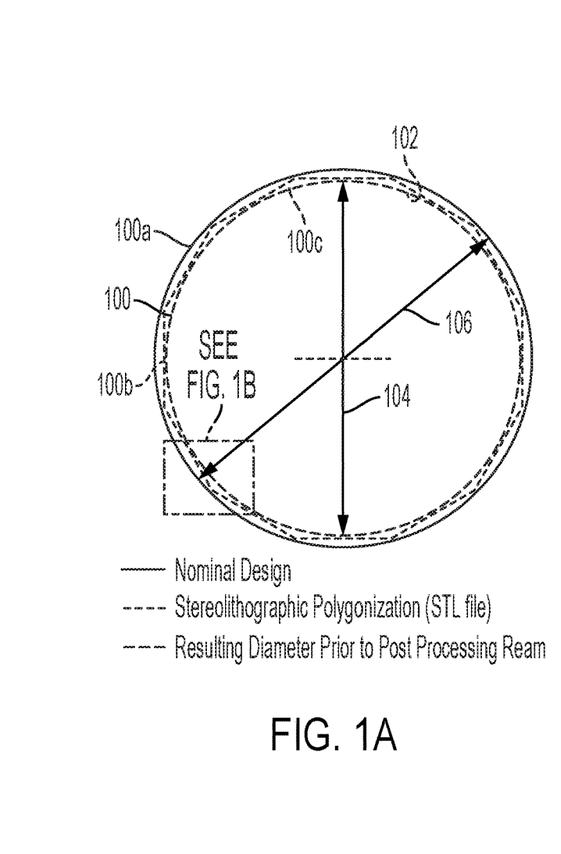
FIG. 1A is a top view of a standard design and manufacturing process for fabricating a hole for receiving an insert and FIG. 1B is a close up view of FIG. 1A.
Figure 1B:
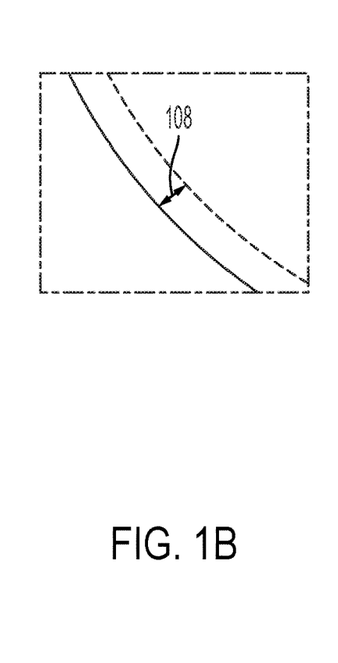

FIG. 1A illustrates a standard design and manufacturing process for fabricating a hole 100 for receiving an insert, showing the nominal design of the internal feature 100a of the hole, the STL polygonization 100b in the STL file used to control the tool manufacturing the internal feature, and the resulting internal feature 100c having a continuous surface 102 manufactured by the tool according to the STL file. The resulting diameter 104 of the hole is undersized (i.e., smaller than the diameter 106 of the hole in the nominal design) and requires post process reaming so that the hole can accommodate an insert or fastener. FIG. 1B is a close up view of FIG. 1A showing that the highlighted distance 108 is a function of STL treatment of the internal curved surface and is proportional to misalignment of the hole center (apart from nominal intent also known as 'positional tolerance accuracy').

Figure 2:
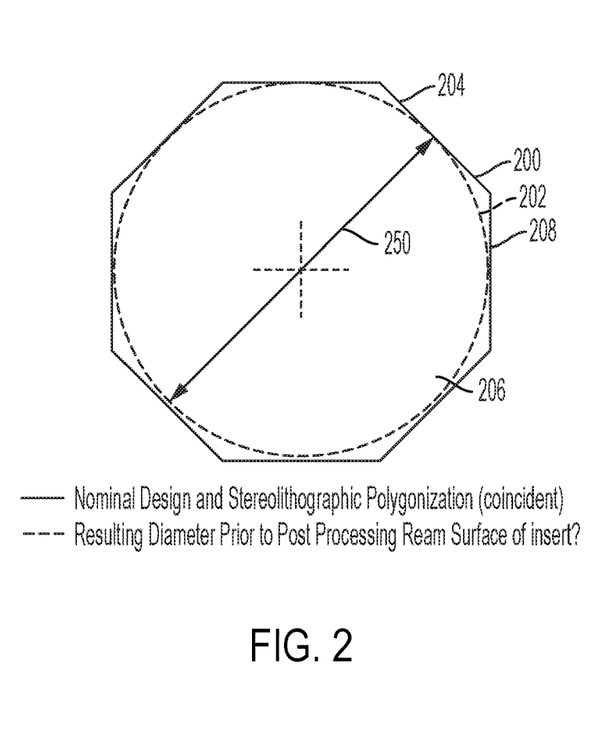
FIG. 2 illustrates a process for manufacturing an opening according to one more examples described herein, using controlled facets to represent internal part features instead of a continuous surface as shown in FIG. 1A.

FIG. 2 illustrates a method of manufacturing a part according to one or more examples illustrated herein, using facets 200 controlled to represent internal part features instead of a continuous surface. The facets 200 are intentionally designed to be tangent to the desired outer contact surface 202 of the insert while only contacting the desired contact surface at the tangent points. Unlike the hole in FIG. 1A, the nominal design 204 of the opening 206 (e.g., hole)

in FIG. 2 is coincident with the STL polygonization 208 represented in the STL file as well as with tangent points to the outer contact surface 202 of the insert. Also shown in FIG. 2 is the diameter 250 of the opening.

Figure 3A:
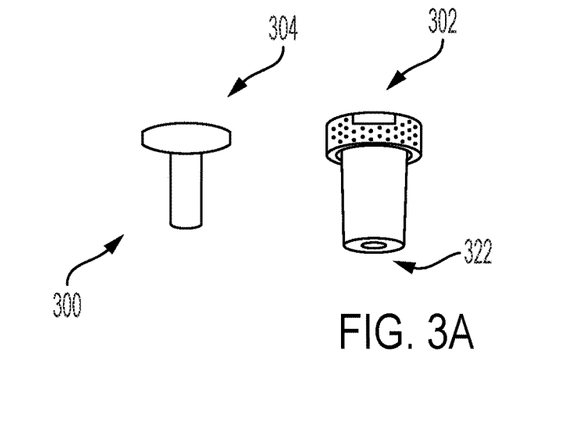
FIG. 3A illustrates example inserts comprising a bushing, a fastener (pin), or a locator.
Figure 3B:
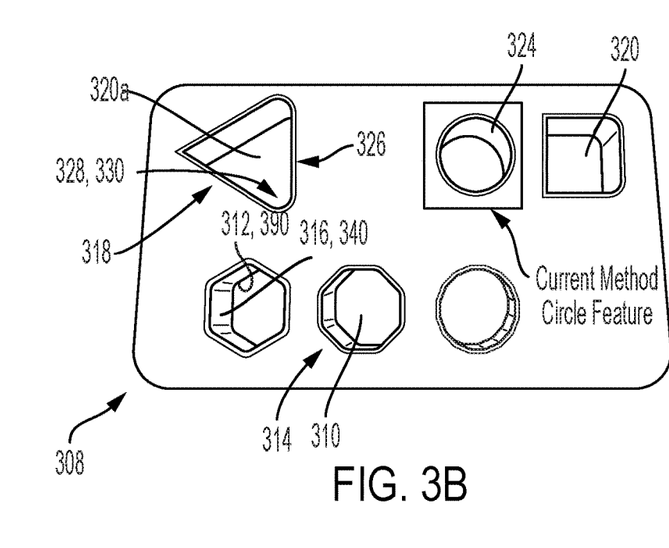
FIG. 3B illustrates an example part comprising example openings for receiving an insert, according to examples described herein.

FIG. 3A illustrates an insert 300 comprising a bushing 302, a fastener 304 (pin), and a locator 306. FIG. 3B illustrates the part 308 comprising an opening 310 for receiving the insert 300, the opening 310 including an internal surface 312 having a polygonal cross-section 314 having a plurality of sides 316. The polygonal cross-section 314 comprises a polygon 318 having first cross sectional area 320 larger than a second cross-sectional area 322 of the insert but the sides 316 still constrain the insert 300 so as to locate the insert in the opening 310 when the insert is inserted into the opening. The number of sides (e.g., facets) can be determined by the designer depending on the application. For comparison, FIG. 3B further illustrates a conventional circular opening or hole 324 having zero facets.

Figure 3C:
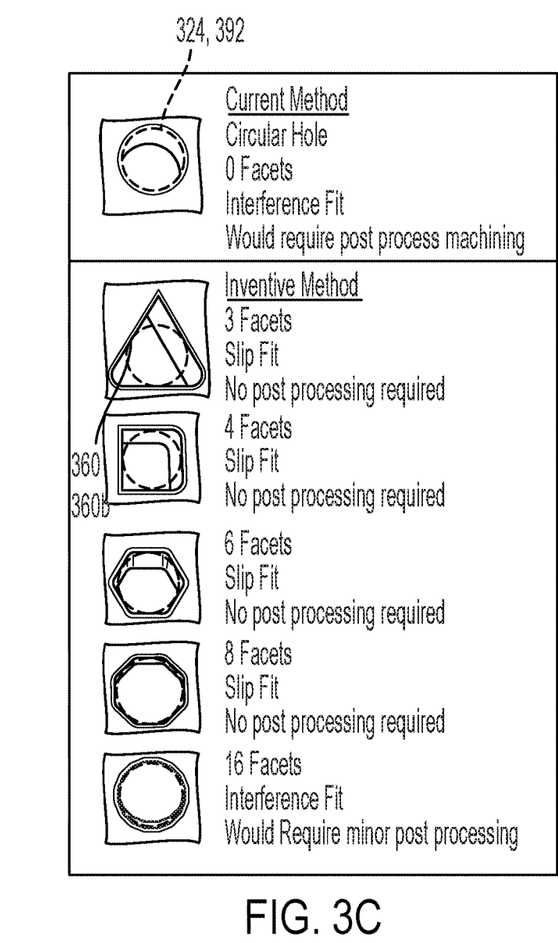
FIG. 3C illustrates post processing for conventional and facetted openings according to one or more examples described herein.

FIG. 3C illustrates the results of inserting a bushing 302 into the "as printed" test block. FIG. 3C illustrates the conventional circular hole 324 with zero facets requires post processing machining in order to achieve the "as designed" slip fit with the bushing, whereas the openings (e.g., hole) having 3, 4, 6, or 8 facets do not require post processing in order to constrain the bushing. The hole having 16 facets requires minor post processing to form the intended slip fit with the bushing, however, this is likely due to the inaccuracies with the AM process used and not the inaccuracies from the STL file.

FIG. 3B and FIG. 3C further illustrate the opening 310 or internal surface 312 comprises a prism 326 (hollow prism), has a shape of a prism, or has sidewalls of a prism. As used herein, a prism is defined as a polyhedron with two polygonal faces lying in parallel planes and with the other faces comprising parallelograms (e.g., rectangles). In other words, the prism is defined as a polyhedron comprising a first base (an n-sided polygonal base) and a second base comprising a translation of the first base, wherein the n other faces are parallelograms (e.g., rectangles) joining corresponding sides of the two bases. The faces or facets may or may not include a radius 328 between one another. A radius may be used to help facilitate printing, depending on the AM process. The radius may also be used to minimize stress concentrations. All cross-sections parallel to the bases are translations of the bases. Prisms are named according to the number of sides on the base (e.g., a prism having a pentagonal cross section is a pentagonal prism a prism and a prism having a hexagonal cross section is a hexagonal prism). The sides or faces of the prism are tangent to the outer contact surface 202 of the insert when the insert is in the opening.

Figure 4A:
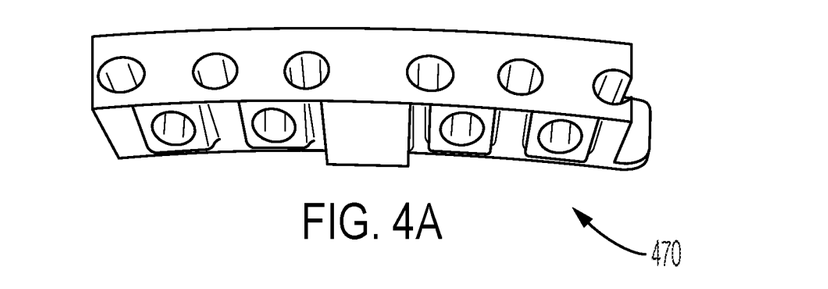
Figure 4B:
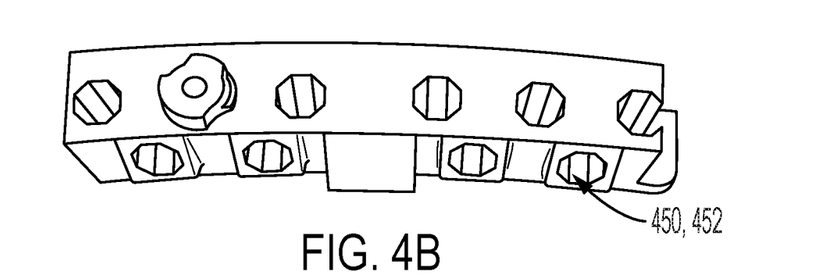
Figure 4C:
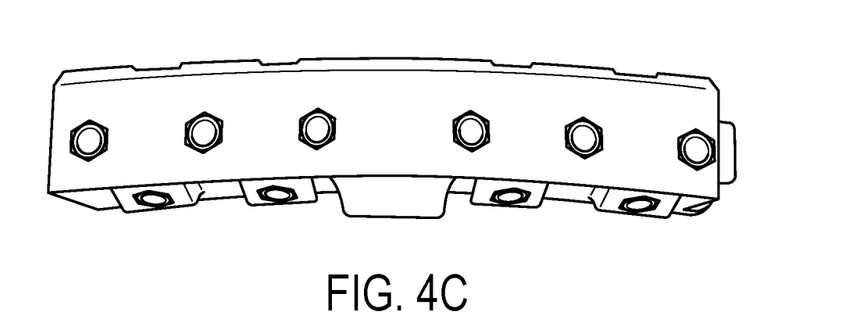

FIG. 4A illustrates a part with holes manufactured using a conventional method; circular hole features which required post processing reaming to achieve the intended slip fit with a bushing. After reaming, a diametric positional tolerance of 0.043 inches was achieved, indicating the hole position had been compromised due to the post processes reaming (i.e., a large amount of material had to be removed during the post processing of the holes. The angularity and location of the openings were altered from the "as printed" condition creating a tolerance zone with a diameter of 0.043 inches of the nominal design hole locations). FIG. 4B illustrates an opening 310 (e.g. hole) for locating slip fit bushings and including internal features (8 facets) achieved a diametric positional tolerance of 0.020 inches with minimal post processing reaming (less material was removed than that used for the hole in FIG. 4A resulting in an increased accuracy). FIG. 4C further illustrates an opening 310 (e.g., hole) for locating press fit bushings including and internal features (6 facets) achieved a diametric positional tolerance of 0.015 inches with no post processing reaming. In FIGS. 4A, 4B, and 4C, the described tolerances were achieved on holes vertical to the print orientation. As illustrated herein, a program executed by the one or more processors can be used to generate a data file for controlling an apparatus (1000a) manufacturing a part (308), the data file including dimensions 450 and a shape 452 of an internal surface of the opening, the dimensions and the shape defining the internal surface having a plurality of facets or a polygonal cross-section.

Example Parts

Parts manufactured according to examples described herein can be used for a variety of applications. For example, the parts illustrated in FIGS. 3B, 3C, 4B, and 4C can be used as a drill jig.

Figure 5:
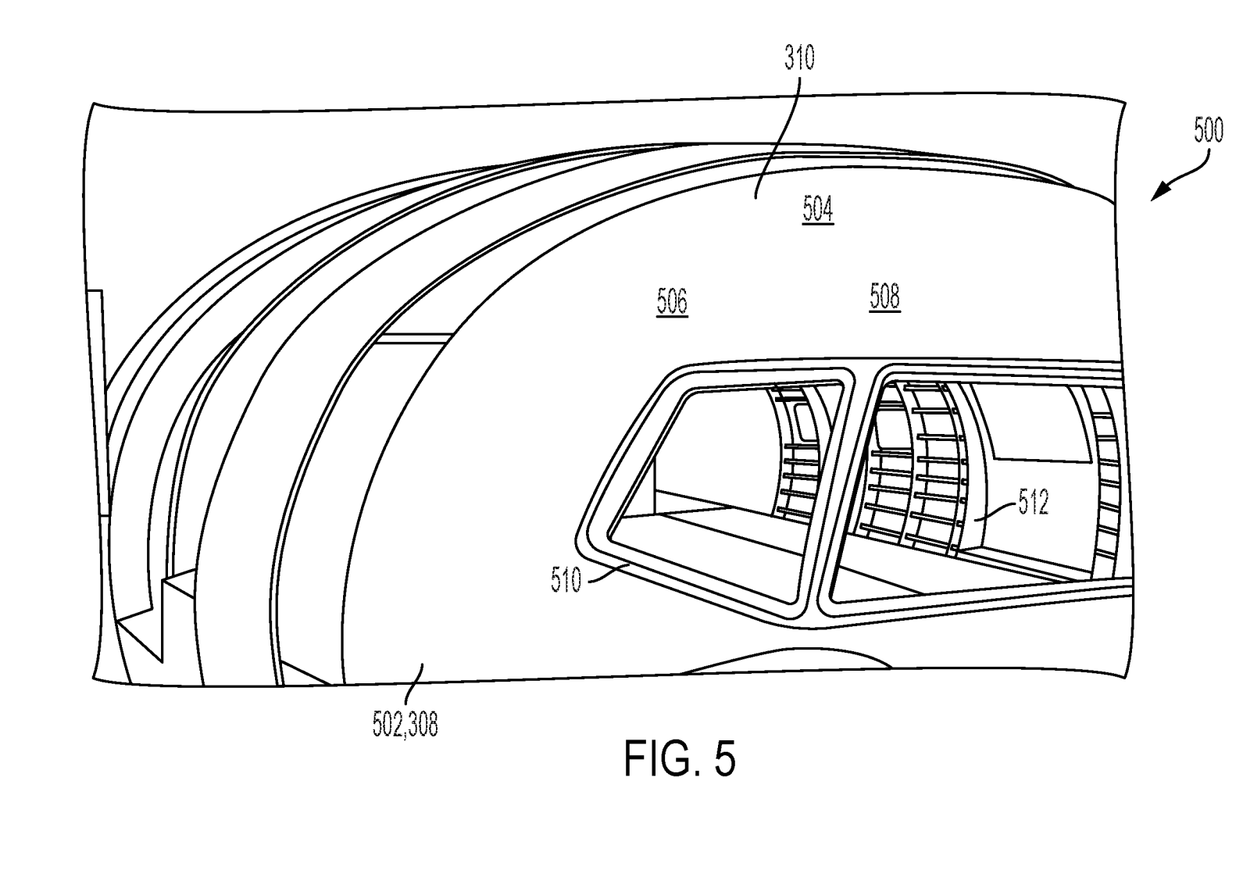
FIG. 5 illustrates an aircraft including panels that can be manufactured according to examples described herein.

FIG. 5 illustrates an aircraft section 500 comprising a structure comprising a part 502, 308 including an opening 310 having a polygonal cross section 314 manufactured according to examples described herein, wherein the part includes at least one structural element 504 selected from a panel 506, a skin 508, a frame 510, and a frame section 512. The structural parts are held together or to a frame using pins passing through the openings 310.

Figure 6:
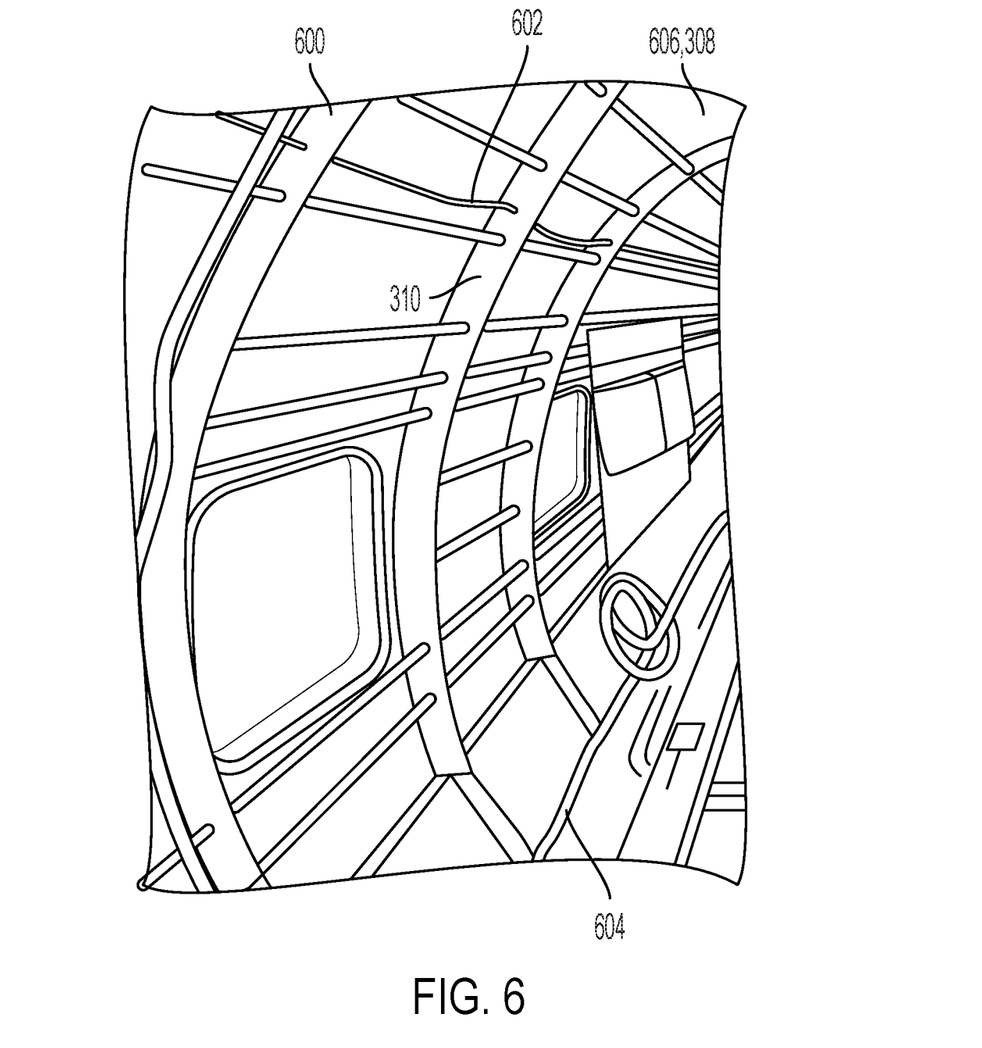
FIG. 6 illustrates a frame or housing for wiring or hose assemblies including parts manufactured according to examples described herein.

FIG. 6 illustrates a housing 600 for a hose 602 and/or wiring 604, wherein the housing 600 comprises the part 606, 308 including an opening 310 having a polygonal cross section 314 manufactured according to examples described herein. The hose or wiring is passed through the openings.

Figure 7:
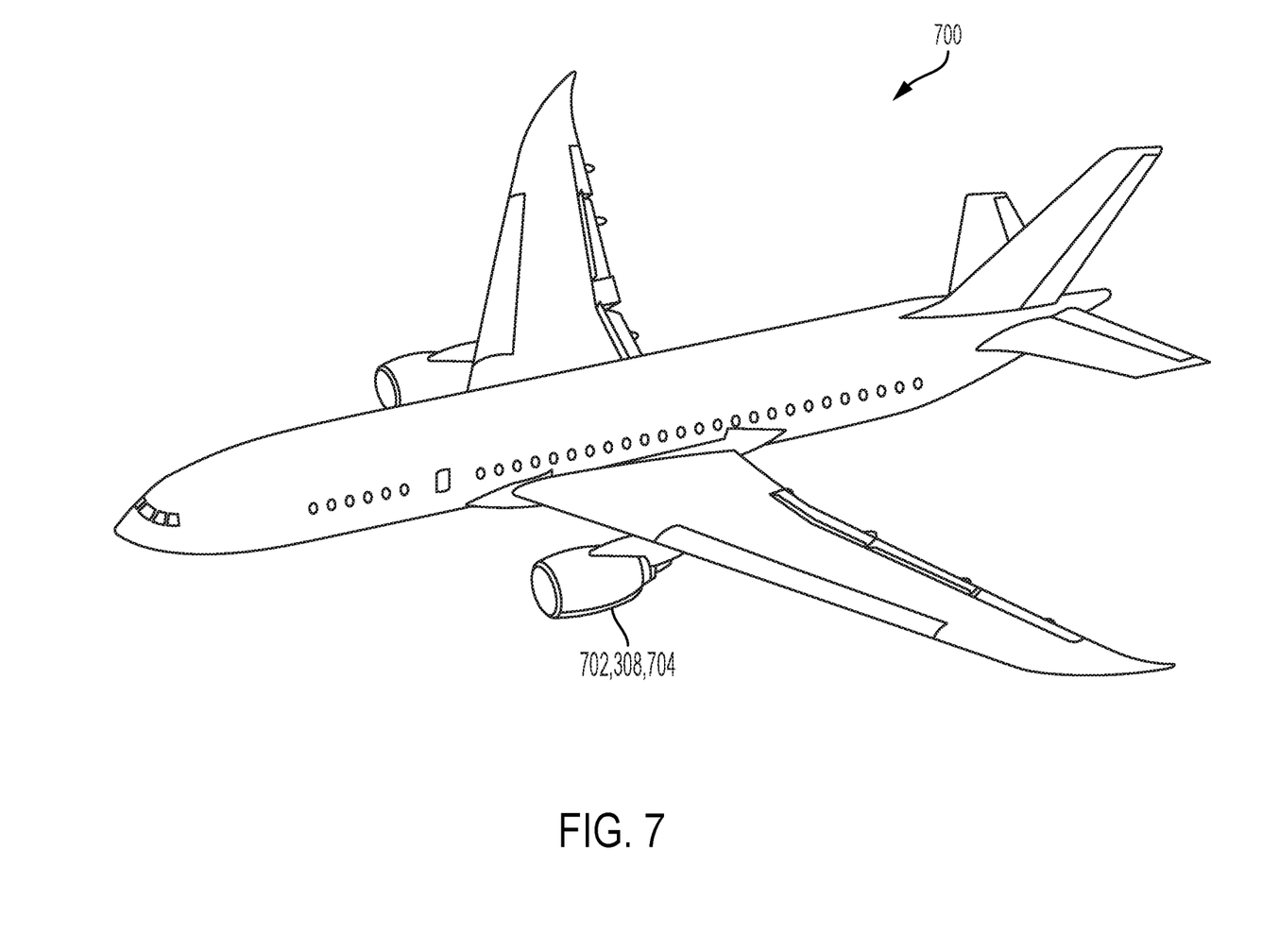
FIG. 7 illustrates an aircraft including an aerodynamic fairing manufactured using a part manufactured according to examples described herein.

FIG. 7 illustrates an aircraft 700 comprising a part 702, 308 manufactured according to examples described herein. In the example shown, an aerodynamic fairing 704 (e.g., nacelle) includes the part 702, 308 including an opening 310 having a polygonal cross section 314. The aerodynamic fairing is secured to the airframe using pins or fasteners passing through the openings in the aerodynamic fairing.

Figure 8A:
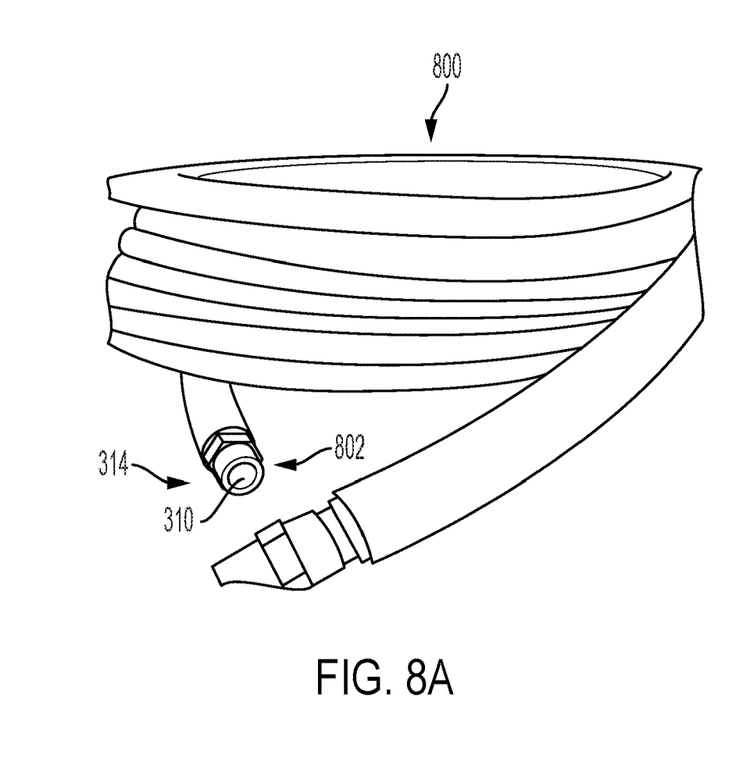
FIG. 8A illustrates a hose assembly and FIG. 8B illustrates a wiring assembly including a parts manufactured according to examples described herein.
Figure 8B:
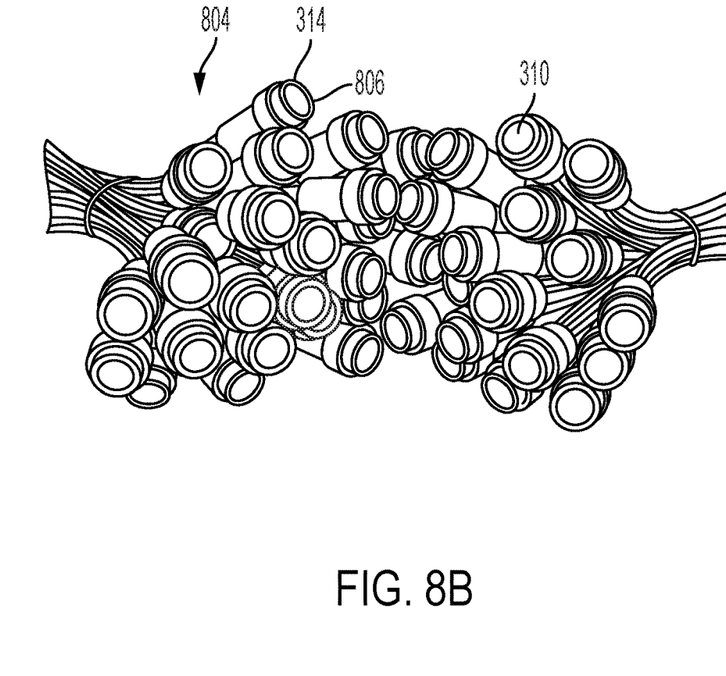

FIG. 8A illustrates a hose assembly 800 including a part 802 including an opening 310 according to examples described herein and FIG. 8B illustrates a wiring assembly 804 including a part 806 having the opening 310. In these examples, the opening 310 can be used to mate to another hose or wire.

Process Steps

Figure 9:
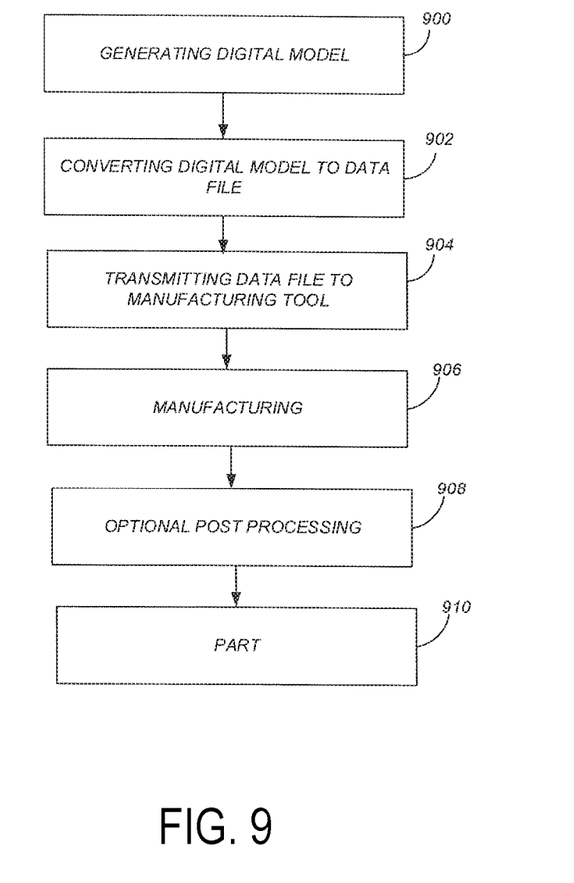
FIG. 9 is a flowchart illustrating a method of manufacturing a part according to one or more examples described herein.

FIG. 9 is a flowchart illustrating a method of manufacturing a part having an opening for receiving an insert.

Block 900 represents generating or obtaining a digital model of the part having the opening including an internal surface. As described herein, the internal surface has a polygonal cross-section including a plurality of sides, the polygonal cross-section comprises a polygon having an area larger than a cross-section of the insert, and the sides are designed to constrain the insert so as to locate the insert in the opening when the insert is inserted into the opening.

Block 902 represents converting the digital model to a data file, or generating a data file, the data file including or representing a three dimensional geometry or surface geometry of the opening and internal features and sides, including dimensions and a shape of the polygonal cross-sections.

Examples of a Data File Include an STL

Block 904 represents transmitting the data file to a manufacturing tool (e.g., 3D printer).

Block 906 represents manufacturing the part including forming the opening using the manufacturing tool. In one or more examples, movement and/or deposition from the tool is controlled using the data file so that the opening has geometry (e.g., the shape and dimensions) of the digital model represented in the data file.

Figure 10:
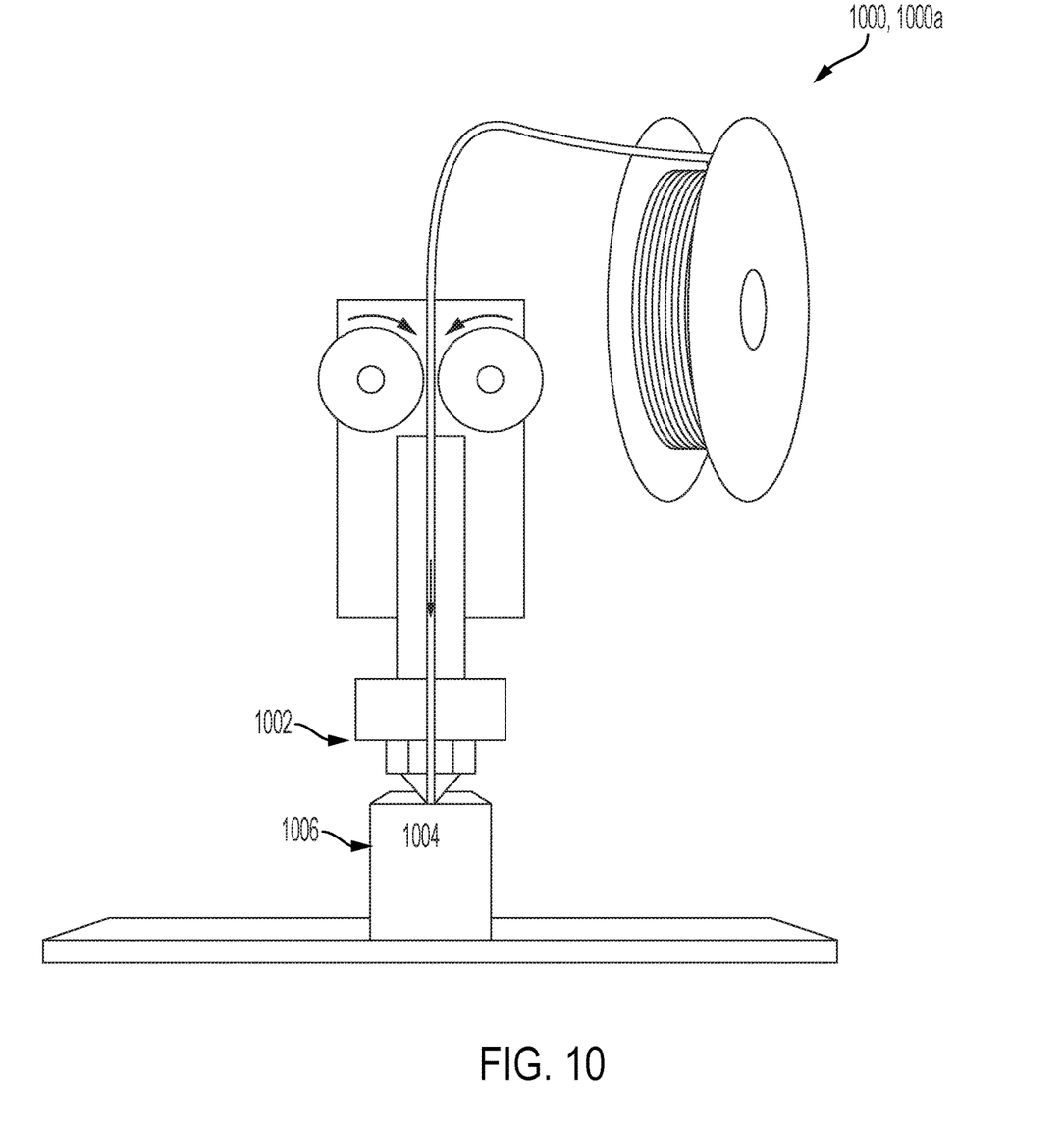
FIG. 10 illustrates an additive manufacturing machine or three dimensional printer used to manufacture a part using fuse filament fabrication, according to one or more examples described herein.

Examples of manufacturing include, but are not limited to, manufacturing the part using CNC milling or manufacturing the part and the opening using additive manufacturing. FIG. 10 illustrates an example of a Fuse Filament Fabrication (FFF) manufacturing tool comprising an apparatus 1000a comprising a three dimensional printer 1000 including a print head 1002, wherein the manufacturing further comprises moving the print head and/or a substrate and additively depositing material (e.g., in layers) from the print head at locations determined from the data file so as to form the part comprising the material. Other AM print methods include, but are not limited to, Vat photo-polymerization, material extrusion, powder bed fusion, binder jetting, material jetting, directed energy deposition, binder jetting. Examples of the material for the part or the insert include at least one material suitable for use with additive manufacturing, e.g., a polymer filament or metallic powder. Example polymers include, but are not limited to, thermoplastics, such as polyamide, polyetherketone (PEK), polyether ether ketone (PEEK), polyetherketoneketone (PEKK), polyimide (PI), Polyetherimide (PEI), Ultem™, or hybrid forms of thermoplastics as previously mentioned, with modifiers and/or inclusions such as carbon nanotube(s), graphene, clay modifier(s), discontinuous fiber(s), surfactant(s), stabilizer(s), powder(s) and particulate(s). Examples of metallic powders include, but are not limited to, aluminum alloy powders, steel alloy powders, or titanium alloy powders.

Block 908 represents optional post processing, if necessary. In one or more examples, the polygonal cross-section reduces the amount of post processing (e.g. reduces a number of post processing steps, e.g., reaming) required to modify dimensions of the opening, as compared to an opening having a circular cross section. In another example, the method does not include further post processing (e.g., reaming) of the opening that modify dimensions and/or shape of the opening.

Block 910 represents the end result, a part including the opening (e.g., hole).

The part or method can be embodied in many ways including, but not limited to, the following.

1. A part, comprising an opening for receiving an insert, the opening including an internal surface having polygonal cross-sections each including a plurality of sides. Thus, the internal surface comprises facets defined by the sides of the polygonal cross-sections. The polygonal cross-sections each comprise a polygon having an area larger than a cross-section of the insert and the sides or facets constrain the insert so as to locate the insert in the opening when the insert is inserted into the opening.

2. A part (308, 502, 606, 702, 802, 806), comprising an opening (206, 310) for receiving an insert (300), the opening (206, 310) including an internal surface (312) having a plurality of facets (200), wherein the opening (206, 310) has a first cross-sectional area (320) larger than a second cross-sectional area (322) of the insert (300), the insert (300) comprises an outer contact surface (202), the facets (200) each comprise a plane (340) tangent at tangent points (360) to the outer contact surface (202), the facets (200) constrain the insert (300) so as to locate the insert (300) in the opening (206, 310) when the insert (300) is inserted into the opening (206, 310), and the tangent points (360) are the only contact points (360b) between the internal surface (312) and the outer contact surface (202).

3. The part of example 2, wherein the internal surface (312) includes a curved surface (330) having a radius (328), and the facets (200) comprise at least two adjacent facets (200) connected by the curved surface.

4. The part of examples 1 or 2, wherein the sides or facets frictionally contact the insert at the tangent points so as to securely fasten the insert in the opening.

5. The part of example 1, wherein one or more of the sides or facets (or all of the sides or facets) are tangent (at one or more tangent points) to an outer contact surface of the insert and the tangent points are the only contact points between the internal surface and the outer contact surface of the insert (e.g., the polygonal cross-section is larger than a circle tangent to all the sides, so that the sides are the only contact points between the internal surface and the outer surface of the insert).

6. The part of example 1, wherein the opening is symmetrical about a center of the openings and the contact points comprise tangent points between the sides and the insert so that a length from the center to the tangent points (and perpendicular to the sides) is substantially equal to a radius of the insert.

7. The part of any of the previous examples 1-5, wherein the opening or internal surface comprises a prism or sidewalls or faces of a prism, has a shape of the prism, so that the sides or faces of the prism comprise facets that are tangent to the outer surface of the insert when the insert is in the opening, thereby constraining the insert.

8. The part of any of the previous examples 1-6, wherein the insert (300) comprises a (e.g., slip fit) bushing (302), a locator (306), or a fastener (304) (e.g., pin).

9. The part of any of the examples 1-7, wherein the part is a drill jig 470 (e.g., as illustrated in FIG. 4C).

10. An aircraft (700) comprising the part of one of the examples 1-9.

11. The part of any of the examples 1-9 and 10, the part comprises at least one structural element (504) selected from a panel (506), a skin (508), a frame (510), and a frame (510) section.

12. An aerodynamic fairing (704) comprising the part of any of the examples 1-7 and 9.

13. A fitting, housing (600), or frame for a hose or wiring (604), a hose assembly (800), or a wiring assembly (804), comprising the part of any of the examples 1-9 and 10.

14. The part of examples 1-13, comprising an additively manufactured or three dimensional (3D) printed part.

15. The part of any of the examples 1-14, wherein a number of the sides or facets is between 3 and 16.

16. The part of any of the examples 1-15, wherein the sides of the polygonal cross-section consist essentially of a surface (390) of material (1004) fabricated by additive manufacturing, and/or the sides or facets do not include a post processed surface (e.g., reamed surface 392) or the sides or facets are not post processed (after the material is deposited using the additive manufacturing) so as to modify a diameter (250) or surface area of the opening.

17. A process of fabricating highly accurate additive manufacture (AM) parts with internal feature(s) having tight tolerance (e.g. orientation or location requirements) that does not require post-print machining process, comprising using controlled facets to represent internal part features, each facet designed to only contact tangent points to the insert so that only the tolerances of the controlling tangent points are passed to the insert being located, instead of having the entire printed line tolerance passed to the insert, wherein faceted features on the AM part can be fully and accurately represented by the STL file generation regardless of the file size since the facets are planar surfaces. The number of facets may be determined by the designer.

18. A process of making an AM part using an STL file converted from a 3D model, wherein the STL file uses straight edges instead of curved edges to tessellate the final part geometry.

19. A process of making an AM part, wherein the AM manufacturing tool prints the part with holes having polygonal internal features instead of a continuous circular surface, allowing accurate part manufacturing without additional post processing steps (e.g., machining, reaming, etc.), thereby decreasing production time and cost. The facets of the polygonal features can depend on desired accuracy and the facets contact the insert so as to be tangent to the desired diameter of the insert.

20. The process or part of any of the preceding examples, wherein the internal surface includes faceted features having the sides, and the faceted features are at least along two different planes including the sidewalls of the opening so that at least one faceted feature is designed for purposes of part accuracy rather than as a support structure for additive manufacturing.

21. The process or part of any of the preceding examples, wherein one or more of the sides do not comprise surfaces of a support structure used to support layers subsequently deposited to form and inclined wall using 3D printing/additive manufacturing and wherein the support structure supports an inclined surface of the layers subsequently deposited.

22. The process or part of any of the preceding examples, further comprising manufacturing the part using additive manufacturing, wherein the internal surfaces comprise planar facets, the planar facets fully and accurately represented by the data file regardless of the data file's size, the planar facets contact the insert at tangent points so that only a tolerance of the manufacturing at the tangent points is transferred to the insert, instead of having tolerances for the entire part being transferred to the insert, and the tolerance transferred to the insert enables an "as printed" part to meet the "as designed" tolerance requirements with little to no post processing of the planar facets.

23. The process or part of any of the preceding examples, wherein the opening does not include a tear drop shape for eliminating support material for the printing process.

Example Hardware Environment

Figure 11A:
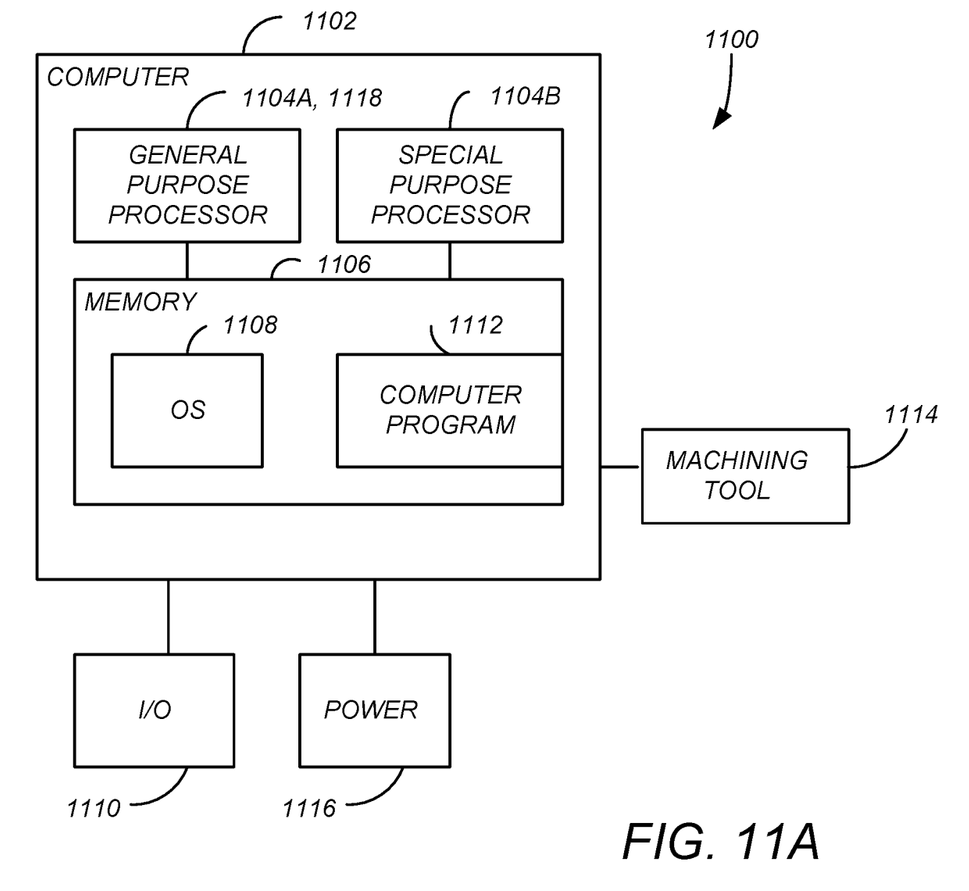
FIG. 11A illustrates a hardware environment for manufacturing a part according to one or more examples described herein.

FIG. 11A illustrates an exemplary computer or system 1100 that could be used to implement processing elements needed to generate the data file or control the manufacturing tool. The computer 1102 comprises a processor 1104 (general purpose processor 1104A and special purpose processor 1104B) and a memory, such as random access memory (RAM) 1106. Generally, the computer 1102 operates under control of an operating system 1108 stored in the memory 1106, and interfaces with the user/other computers to accept inputs and commands (e.g., analog or digital signals) and to present results through an input/output (I/O) module 1110. The computer program application 1112 accesses and manipulates data stored in the memory 1106 of the computer 1102. The operating system 1108 and the computer program 1112 are comprised of instructions which, when read and executed by the computer 1102, cause the computer 1102 to perform the operations herein described. In one example, instructions implementing the operating system 1108 and the computer program 1112 are tangibly embodied in the memory 1106, thereby making a computer program product or article of manufacture. As such, the terms "article of manufacture," "program storage device" and "computer program product" as used herein are intended to encompass a computer program accessible from any computer readable device or media. FIG. 11 further illustrates a power source 1116 for providing power to the system 1100.

Thus, FIG. 11A further illustrates a computer implemented system for manufacturing a part (e.g., as described herein or in examples 1-16 described above), comprising one or more processors (1104); one or more memories (1106); and a program (1112) stored in the one or more memories, wherein the program executed by the one or more processors generates a data file (1118) for controlling an apparatus (1000a) manufacturing a part (308), the part having an opening for receiving an insert (300), the data file including dimensions (450) and a shape (452) of an internal surface of the opening, the dimensions and the shape defining the internal surface having a polygonal cross-section including a plurality of sides, and wherein the sides constrain the insert so as to locate the insert in the opening when the insert is inserted into the opening. A three dimensional printer or CNC milling tool can include or be coupled to the processors and the memories.

Figure 11B:
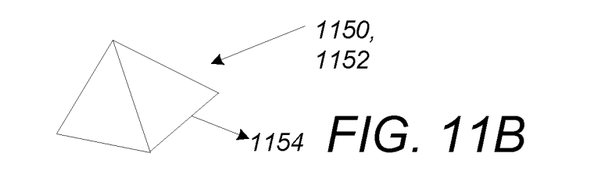
FIG. 11B illustrates a mesh including a tessellated triangle generated using a data file, according to one or more examples described herein.

In a conventional method, the STL file takes the geometrical shape of the three dimensional model and tessellates it with a plurality of triangles and normal vectors to generate a map of the desired AM part to be printed. The method requires a large storage space so as to generate all the triangles. The current process also requires post-processing steps to finalize the hole since the resulting diameter is smaller than the nominal design. In one or more examples described herein, on the other hand, the software program creates a data file that accurately and fully represents the facets (sides) of the opening (regardless of data file's size) because the facets are planar surfaces. Thus, the data file can generate an opening with tight tolerances without needing to reduce tessellation mesh size. In one or more examples, the program or software enables the designer to control the tessellation during data file creation, e.g., so as to make a mesh (1150) comprising tessellated triangles (1152) that are tangent to the desired contact surface of the insert at one point per tessellated triangle edge (1154) (as shown in FIG. 2 and FIG. 11B) thereby achieving tight tolerances without needing to reduce tessellation mesh size.

Those skilled in the art will recognize many modifications may be made to this configuration without departing from the scope of the present disclosure. For example, those skilled in the art will recognize that any combination of the above components, or any number of different components, peripherals, and other devices, may be used.

Advantages and Improvements

While current Additive Manufacturing design approaches have used faceted features to minimize support structures in certain print orientations, the present invention is directed to the use of an increased number of faceted features to improve product accuracy regardless of print orientation. Thus, examples of the design methods described herein solve the problem of added fabrication cost to Additively Manufactured parts that require tight tolerances. Internal part features that have tight tolerance requirements are generally used for accurately locating an insert. Having each facet designed to only contact tangent points with the insert is more accurate because only the tolerance at the controlling facet point is passed to the insert being located, instead of having the entire printed line tolerance passed to the insert. Moreover, the methods illustrated herein also allows print method inaccuracies to be concentrated to areas that do not get transferred to the insert. In one or more examples, the final print tolerances achieved using example methods described herein are comparable to tolerances achieved using CNC machining. This further reduces part cost of the AM part since machining can be reduced or eliminated from the post processing step.

CONCLUSION

This concludes the description of the preferred examples of the present disclosure. The foregoing description of the preferred example has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of manufacturing a part, comprising: manufacturing the part comprising an aircraft part or a drill jig having an opening for receiving an insert, including:
   depositing a material using additive manufacturing; and
   forming the opening using the additive manufacturing, the opening having an internal surface, the internal surface having a plurality of facets, wherein:
   the opening has a first cross-sectional area larger than a second cross-sectional area of the insert,
   the insert comprises an outer contact surface,
   the facets each comprise a planar region tangent at tangent points to the outer contact surface when the insert is inserted in the opening,
   the facets constrain the insert so as to locate the insert in the opening when the insert is inserted into the opening, and
   the tangent points are the only contact points between the internal surface and the outer contact surface.

2. The method of claim 1, wherein:
   the internal surface includes a curved surface having a radius, and
   the facets comprise at least two adjacent facets connected by the curved surface.

3. The method of claim 1, wherein:
   the facets consist essentially of a surface of the material deposited by additive manufacturing, and
   the facets do not include a reamed surface or are not post processed (after the material is joined using additive manufacturing) so as to modify a diameter or surface area of the opening.

4. The method of claim 3 further comprising:
   generating a data file including a plurality of dimensions and a shape of the opening; and wherein the manufacturing comprises forming the opening having the shape and dimensions obtained from the data file; and
   manufacturing the part using additive manufacturing, wherein:
   the generating comprises selecting a resolution of the data file taking into account the internal surface comprises a plurality of facets, the facets contacting the insert at the tangent points so that only a tolerance of the manufacturing at the tangent points is transferred to the insert, instead of having tolerances for an entirety of the part being transferred to the insert.

5. The method of claim 4, wherein an apparatus manufacturing the part uses a method of additively manufacturing the part by depositing, fusing or solidifying a material layer by layer at locations determined from the data file so as to form the part comprising the material, wherein:
the facets are at least along two different planes including sidewalls of the opening so that at least one facet is designed for purposes of part accuracy rather than as a support structure for the additive manufacturing; and
the support structure is defined as a structure supporting layers subsequently deposited to form an inclined wall using the additive manufacturing.

6. The method of claim 1, wherein a number of the facets per opening is between 3 and 16.

7. The method of claim 1, wherein the facets reduce a number of post processing steps required to finalize a plurality of dimensions of the opening, as compared to hole having a circular cross section used to locate the insert.

8. A part, comprising:
   an additively manufactured aircraft part or additively manufactured drill jig comprising an additively manufactured opening for receiving an insert, the opening including an additively manufactured internal surface having a plurality of facets, wherein:
   the opening has a cross-sectional area having a first cross-sectional area larger than a second cross-sectional area of the insert,
   the insert comprises an outer contact surface,
   the facets each comprise a planar region tangent at tangent points to the outer contact surface when the insert is inserted in the opening,
   the facets constrain the insert so as to locate the insert in the opening when the insert is inserted into the opening, and
   the tangent points are the only contact points between the internal surface and the outer contact surface.

9. The part of claim 8, wherein the insert comprises a locator or a fastener, the fastener having a length capable of passing through the opening and another part being fastened to the aircraft part with the fastener.

10. The part of claim 8, wherein the insert comprises a bushing.

11. The part of claim 8, wherein the part is the drill jig comprising a thickness, the opening extending through the thickness, and the planar regions extending along a majority of the thickness.

12. An aircraft comprising the part of claim 8.

13. The part of claim 12, wherein the aircraft part comprises at least one structural element selected from a panel, a skin, a frame, and a frame section.

14. An aerodynamic fairing comprising the part of claim 8.

15. A housing for a hose or wiring, a hose assembly, or a wiring assembly, comprising the part of claim 8.

16. The part of claim 8 wherein:
   the aircraft part comprises a structural part,
   the insert comprises a rivet or pin having a head and a tail, and a length capable of passing through the opening and another structural part so that the head is positioned on one side of the structural parts and the tail projects from an opposite side of the structural parts.

17. The part of claim 16, wherein:
   the facets consist essentially of a surface of the material deposited by the additive manufacturing, and
   the facets do not include a reamed surface or are not post processed (after the material is joined using additive manufacturing) so as to modify a diameter or surface area of the opening,
   the second cross sectional area of the insert has a linear edge comprising the tangent points, and the first cross sectional area is larger than the second cross sectional area along an entire length of the insert when the insert is not inserted in the opening.

18. A computer implemented system for manufacturing a part, comprising:

one or more processors; one or more memories; and a program stored in the one or more memories, wherein the program executed by the one or more processors:

generates a data file for controlling an apparatus additively manufacturing a part having an opening for receiving an insert, the data file including dimensions and a shape of an internal surface of the opening, resolution of the data file is selected taking into account the dimensions and the shape defining the internal surface a plurality of facets, wherein the opening has a first cross-sectional area larger than a second cross-sectional of the insert, the insert comprises an outer contact surface, the facets each comprise a planar region tangent at tangent points to the outer contact surface when the insert is inserted in the opening, the facets constrain the insert so as to locate the insert in the opening when the insert is inserted into the opening, and selects a resolution of the data file taking into account the tangent points are the only contact points between the internal surface and the outer contact surface of the insert.

19. The computer implemented system of claim 18, wherein the data file comprises a mesh including tessellated triangles that are designed to be tangent to a contact surface of the insert at one point per edge of each of the tessellated triangle.

20. The part of claim 8, wherein:

the aircraft part comprises a structural part, the insert comprises a rivet or pin having a head and a tail, and a length capable of passing through the opening and another structural part so that the head is positioned on one side of the structural parts and the tail projects from an opposite side of the structural parts.

* * * * *